(12) United States Patent
Liao (10) Patent No.: US 8,295,024 B2
(45) Date of Patent: Oct. 23, 2012

(54) SURGE ENERGY TRANSFER CIRCUIT

(76) Inventor: Shun-An Liao, Yonghe (TW)

( * ) Notice: Subject to any disclaimer, the term of this patent is extended or adjusted under 35 U.S.C. 154(b) by 101 days.

(21) Appl. No.: 12/907,022

(22) Filed: Oct. 18, 2010

(65) Prior Publication Data

US 2011/0181994 A1   Jul. 28, 2011

(30) Foreign Application Priority Data

Jan. 27, 2010   (JP) .................................. 2010-015160

(51) Int. Cl.
*H02H 3/22* (2006.01)
(52) U.S. Cl. ........................................................ 361/118
(58) Field of Classification Search .................. 361/118, 361/127
See application file for complete search history.

(56) References Cited

U.S. PATENT DOCUMENTS

| | | | | |
|---|---|---|---|---|
| 4,584,622 A * | 4/1986 | Crosby et al. | .................... | 361/56 |
| 4,677,518 A * | 6/1987 | Hershfield | ........................ | 361/56 |
| 5,023,745 A * | 6/1991 | Glass | ............................... | 361/56 |
| 5,038,245 A * | 8/1991 | Gronskog | ........................ | 361/56 |
| 5,353,189 A * | 10/1994 | Tomlinson | ..................... | 361/118 |
| 5,617,284 A * | 4/1997 | Paradise | ........................... | 361/58 |
| 6,288,917 B1 * | 9/2001 | Redburn et al. | ................. | 363/39 |
| 2004/0027754 A1 * | 2/2004 | Freyman | ....................... | 361/91.1 |
| 2009/0109585 A1 * | 4/2009 | Liao | ................................ | 361/58 |

* cited by examiner

*Primary Examiner* — Rexford Barnie
*Assistant Examiner* — Angela Brooks (57) ABSTRACT

A surge energy transfer circuit comprises a surge protection device, gas tube, inductor and high voltage capacitor for significantly reducing surge energy entering a power facility, lowering a remnant surge voltage to convert the surge energy in a voltage form. The converted voltage is superimposed to an operating power to slightly cause a rise of a peak value of the operating voltage. After the surge energy is converted in tens of mS, the operating power returns to a normal voltage value. Accordingly, the lifetime of the surge protection device can be extended and the surge immunity of the power facility can be improved to normal under surge interference situations.

12 Claims, 9 Drawing Sheets

SURGE ENERGY TRANSFER CIRCUIT

BACKGROUND OF THE INVENTION

1. Field of the Invention

The present invention relates to a surge energy transfer circuit related to surge suppression techniques, and more particularly to an integrated circuit that can not only absorb surge energy but also convert the remaining surge energy into usable voltage form that also completely protects power facilities.

2. Description of the Related Art

Surge vulnerability interference arises from the large energies involved, making it a major source of surge interference. Lighting flash surge (LFS) is a typical source of surge interference. As a practical matter, power facilities are prone to failure when confronted with LFS due to insufficient surge protection.

As for adequate surge protection schemes used for securing normal operations of power facilities, many patents have been disclosed, such as U.S. Pat. No. 5,353,189 "Surge protector for vehicular traffic monitoring equipment", U.S. Pat. No. 5,617,284 "Power surge protection apparatus and method", U.S. Pat. No. 5,038,245 "Method and apparatus for suppressing electrical transients", U.S. Pat. No. 4,677,518 "Transient voltage surge suppressor", U.S. Pat. No. 4,584,622 "Transient voltage surge suppressor", and the like. All of these patents basically employ a structure that emphasizes on the use of a clamping voltage or remnant surge voltage suppression while lacking an adequate consideration of processing surge energy.

Remnant surge voltage is not the main cause leading to power facility failures. Remnant surge energy generated by a residual current flowing in the power equipment must be taken into account as well. According to ANSI/IEEE C62.41 standard "Recommended Practice on Characterization of Surges in Low-Voltage (1000 V and Less) AC Power Circuits", outdoor power facilities are classified as C category devices for surge interference. A combination waveform surge test in accordance with the C3 category is 20 kV 1.2/50 μSec and 10 kA 8/20 μSec. The energy generated by the combination waveform surge can go up to more than 1,000 Joules and easily destroy power facilities.

The reason that methods of the prior art are ineffective in processing surge energy lies in using circuits built around a surge protection device, a gas tube choke, to process the surge and targeted at reducing the remnant surge voltage of the power supply end of power facilities. However, as the current withstanding capability of the choke is low, there are no methods explaining how to reduce the remnant surge energy of the power supply end of power facilities. In fact, methods or techniques for reducing remnant surge voltage fail to effectively process surge energy, with the result that surge energy may still easily destroy power equipment.

To overcome the shortcomings of the prior, the inventor has disclosed an effective alternative in US Patent Application No. 2009/0109585 A1, entitled "Series surge suppression structure", that is, a method that takes the clamping voltage and energy storage into account, to significantly reduce remnant surge voltage and remnant energy entering power facilities, thereby achieving a superior protection result.

In pursuit of constant betterment, a surge energy transfer circuit is further developed to absorb and transfer surge energy by means of a parameter adjustment design, significantly lowering the surge energy entering power facilities and reducing remnant surge voltages, and ensuring to substantially protect power facilities and enhance surge immunity within power facilities.

SUMMARY OF THE INVENTION

An objective of the present invention is to provide a surge energy transfer circuit that not only absorbs surge energy but also converts the remaining surge energy into a usable form to thoroughly protect power facilities.

To achieve the foregoing objective, a surge energy transfer circuit has an input terminal, an output terminal, an energy absorption unit, a surge energy transfer unit, a surge energy charge and discharge unit and an equipotential grounding unit.

The surge absorption unit is connected to the input terminal and has two surge protection devices (SPD) for absorbing a percentage of input surge energy.

The surge energy transfer unit is connected to the surge absorption unit, and is formed by at least two inductors having an identical inductance or at least two groups of inductors having an identical inductance for temporarily storing a remaining percentage of the input surge energy and converting the remaining percentage of the input surge energy into a usable voltage, in which the percent of the converted surge energy out of the input surge energy is equal to the percent of a figure obtained by subtracting the input surge energy absorbed by the surge absorption unit from the input surge energy out of the input surge energy.

The surge energy charge and discharge unit is connected to the surge energy transfer unit and the output terminal, and has at least one high voltage capacitor or at least one group of high voltage capacitors to charge and discharge the voltage converted from the remaining percentage of the inputted surge energy, in which a time duration elapsing for charging or discharging is determined by a magnitude of the selected high voltage capacitor.

The equipotential grounding unit is connected to the surge absorption unit, the surge transfer unit, the surge energy charge discharge unit, the input terminal and the output terminal, and has at least two SPDs having identical characteristics so as to maintain a constant voltage at the output terminal when the input surge energy is coupled to ground, thereby significantly reducing the input surge energy and a remnant surge voltage represented by the converted form of voltage by serially connecting a circuit formed by the foregoing units to a path through which a surge passes.

The surge energy transfer circuit has the following advantages:

1. The SPD, inductors and high voltage capacitors are employed to reduce the remnant surge voltage, convert surge energy into a voltage form superimposed on the operating power to slightly increase the operating voltage. Given this approach, the lifetime of the SPD is extended and the surge immunity of power facilities is also increased.

2. The SPD and gas tube are serially connected with the input terminal to form a two-stage surge suppression unit that effectively enhances surge suppression capabilities.

3. A two-port structure, one port being the input terminal and the other being the output terminal for protecting power facilities, protects the power facilities by way of a serial connection.

4. The input terminal is connected with an external power source, and the output terminal is connected to a power facility. The surge energy transfer circuit can be serially connected to an external wire and the power facility to form a surge energy transferring means, thereby substantially increasing the surge immunity of power facilities.

More importantly, adopting the present invention not only converts surge energy into a usable voltage form and calculates the operating voltage rise range and the lasting time duration, but also builds products in compliance with customized demand. Accordingly, the present invention can be extensively applied to various types of power facilities to effectively avoid surge interference and keep power facilities operating normally.

DETAILED DESCRIPTION OF THE INVENTION

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
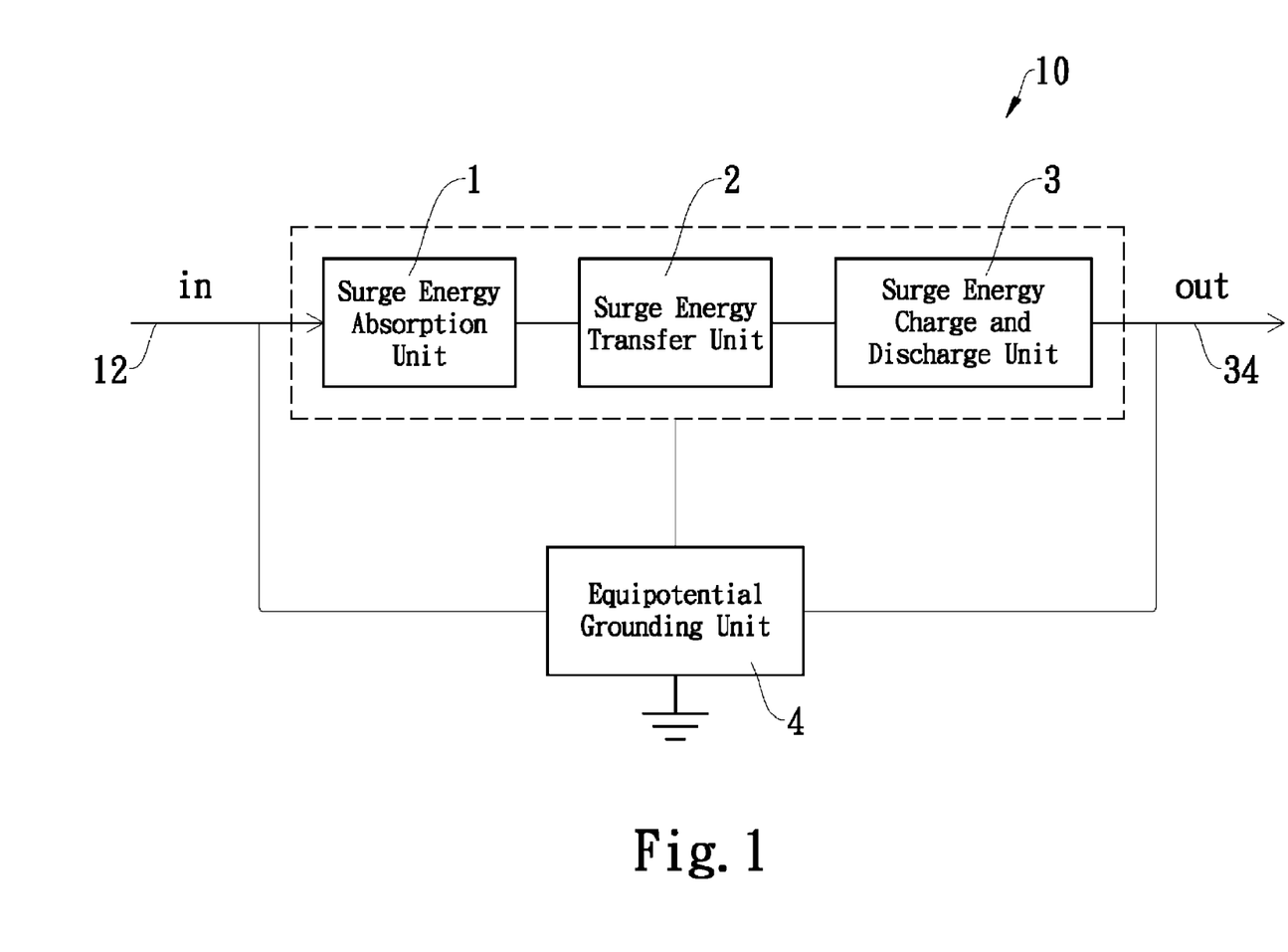
FIG. 1 is a functional block diagram of a surge energy transfer circuit in accordance with the present invention.
Figure 2:
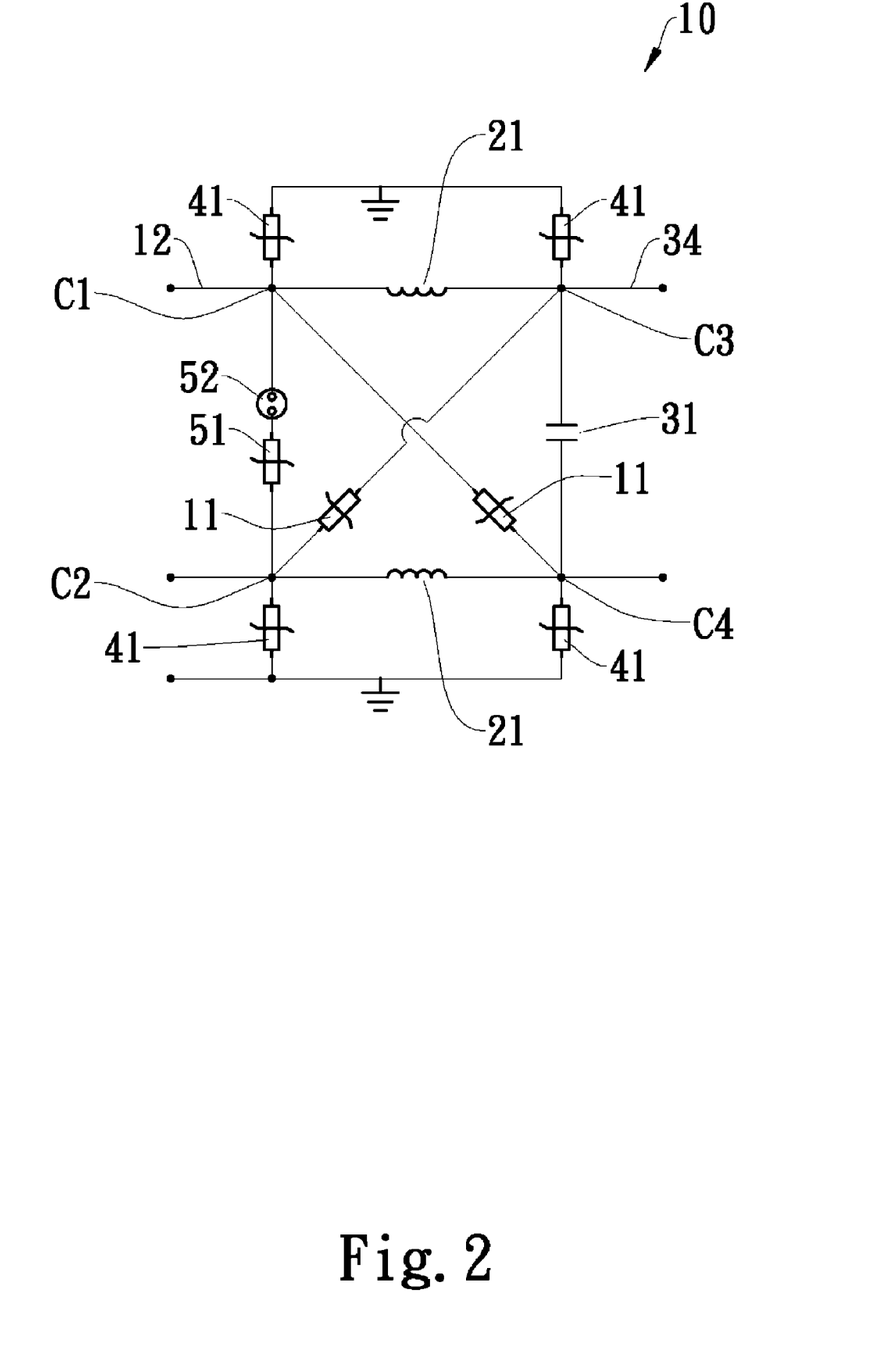
FIG. 2 is a circuit diagram of the surge energy transfer circuit in FIG. 1.

With reference to FIGS. 1 and 2, a surge energy transfer circuit 10 in accordance with the present invention has an input terminal 12, an output terminal 34, a surge absorption unit 1, a surge energy transfer unit 2, a surge energy charge and discharge unit 3, and an equipotential grounding unit 4.

The surge absorption unit 1 is connected to the input terminal 12, and includes two or more surge protection devices (SPD) 11 having functionally identical characteristics and serving to absorb a percent of the input surge energy. Additionally, to facilitate to mark reference numerals in the description while not disobeying word meaning, the relevant SPD is relocated ahead of the surge protection device 11.

The surge energy transfer unit 2 is connected to the surge absorption unit 1, and includes at least two inductors 21 having an equal inductance or two groups of inductors 21 having an equal inductance (despite two inductors being illustrated in FIG. 2, the number of inductors is not so limited when the surge energy transfer unit is implemented) for temporarily storing a remaining percentage of the input surge energy exceeding a specific percentage thereof and for converting the remaining percentage of the input surge energy into a usable voltage form, in which the percentage of the converted surge energy out of the entire input surge energy is equal to the percent of the figure subtracting the surge energy absorbed by the surge absorption unit 1 from the input total surge energy out of the entire input surge energy.

The surge energy charge and discharge unit 3 is connected to the surge energy transfer unit 2 and an output terminal 34, and includes at least one high voltage capacitor 31 or at least one group of high voltage capacitors (despite a high voltage capacitor illustrated in FIG. 2, the number of high voltage capacitors is not so limited when the surge energy charge and discharge unit is implemented) to charge and discharge the voltage converted from surge energy, in which the time duration for charging or discharging is determined by the magnitude of the selected high voltage capacitor 31.

The equipotential grounding unit 4 is connected to the surge absorption unit 1, the surge transfer unit 2, the surge energy charge discharge unit 3, the input terminal 12 and the output terminal 34, and includes at least two SPDs 41 having functionally identical characteristics so that the surge energy transfer circuit can generate an equipotential effect to a surge coupled through ground.

With reference to FIGS. 1 and 2, when implemented, the surge energy transfer circuit 10 may have a two-port structure. One port is the input terminal 12 connected with a power source or a signal line, and the other port is the output terminal 12 serving as a protection terminal for a power facility.

The two or two groups of inductors 21 are parallelly connected between the input terminal 12 and the output terminal 34. The one or one group of high voltage capacitors 31 is/are connected with one end of each of the two inductors 21 that are connected to the output terminal 34. The surge absorption unit 1 has two SPDs 11 crossly connected with the two inductors 21. Two ends of each of the two SPDs 11 are respectively connected to one end of one of the two inductors 21 and one end of the other of the two inductors 21. The surge absorption unit 1 is intersected with the two inductors 21 at nodes C1, C2 adjacent to the input terminal 12 and nodes C3 and C4 adjacent to the output terminal 34. The equipotential grounding unit 4 has four SPDs 41 having functionally identical characteristics. Each of the four SPDs 41 is connected between each of the four nodes C1, C2, C3, C4 and ground.

When being implemented, the surge energy transfer circuit 10 further includes a SPD 51 and a gas tube 52 serially connected to the input terminal 12 to constitute a two-stage surge suppression structure for higher surge suppression effect.

Given the foregoing structure, the surge energy transfer circuit 10 can be serially connected between an external connection wire and a power facility to create a surge energy transfer and protection effect, thereby substantially reducing the surge energy that enters the power facility to maintain normal operations of the power facility and extend the life duration of the power facility. Specifically, the life durations of the SPDs 11, 41, 51 are extended and the surge immunity of the power facility is enhanced so that the power facility can keep operating when encountering surges from the environment.

The present invention further includes a method for how to calculate surge energy with a voltage form converted from the surge energy so as build a practical product in accordance with a customized voltage rise margin and lasting time duration.

With reference to FIG. 2, the surge energy transfer circuit 10 has three SPDs 11, 41, 51, a gas tube 52, an inductor 21 and a high voltage capacitor 31. The converted surge energy entering the power facility and the resulting suppression effect can be expressed by the following equations.

The SPDs 11, 41, 51 used in the mathematical derivation of the method in accordance with the present invention are designed based on various clamping voltages $V_{clamping}$. The higher the $V_{clamping}$ is, the lower a residual current $I_r$ flowing through the SPD 11 is, and the lower the $V_{clamping}$ is, the higher the residual current $I_r$ flowing through the SPD 11 is. The mathematical derivation of the method of the present invention adopts a design framework letting values of residual currents flowing through the SPD between C1, C4 be k, and a value of a residual current flowing through the inductor 21 be 1−k, in which the value of k is in a range from 0.1 to 0.9.

Figure 3:
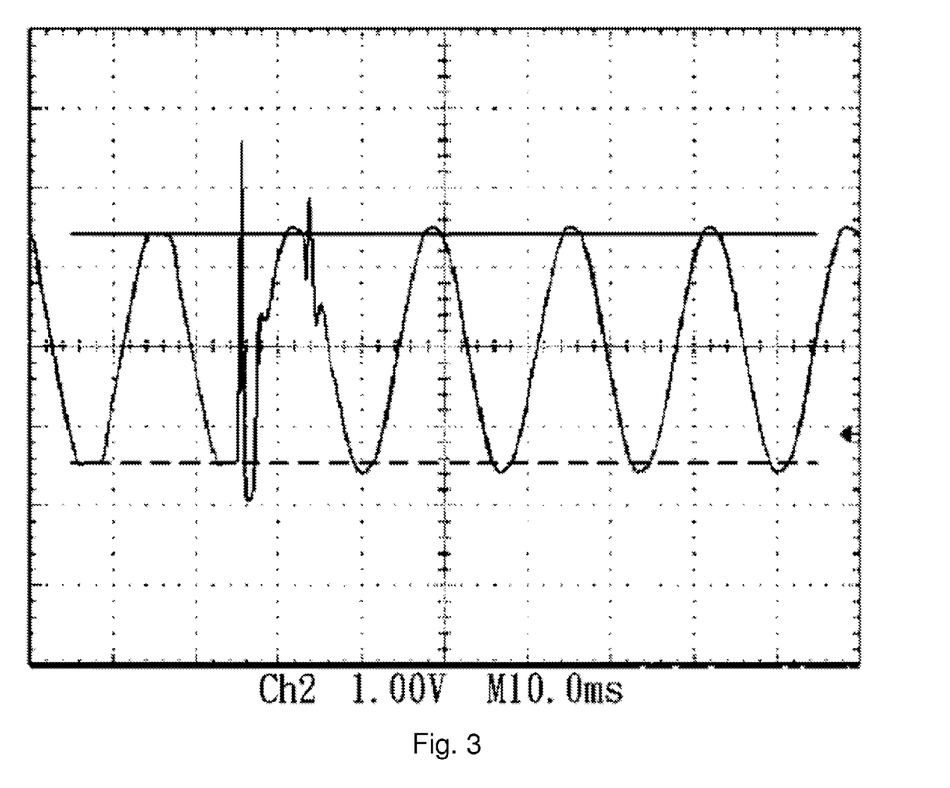
FIG. 3 is a test diagram showing normal mode coupling for the surge energy transfer circuit in FIG. 1.

1. With reference to FIGS. 2 and 3, when an operating voltage is applied to the input terminal 12 and a vulnerability interference surge enters the input terminal 12, normal mode coupling occurs.

Given a voltage $V_{34}$ of the output terminal 34 of the surge energy transfer circuit 10 for protecting the power facility, energy $E_L$ is stored in two inductors 21, and an inductance L and a voltage $V_L$ of the inductor 21, an energy $E_{(L)}$ is momentarily stored in the inductor 21 and a transient voltage $V_{(L)}$ of the inductor 21 when a surge current $I_L$ flows through the inductor 21 can be respectively expressed as follows:

$$E_{(\Delta L)} = 2 \times (1/2) \times L(I_L)^2 = L[(1-k) \times I_r]^2$$

$$V_{(\Delta L)} = L(dI_L/dt) = (1-k) \times L(dI_r/dt)$$

A remnant surge voltage of the output terminal 34, $V_r$, is expressed by:

$$V_r = V_{clamping} - V_{(\Delta L)} \quad (1)$$
$$= V_{clamping} - (1-k) \times L(dI_r/dt)$$

where k is in a range of 0.1 to 0.9.

As known from equation (1), the magnitude of the inductor 21 (L) is inversely proportional to the remnant surge voltage $V_r$. The less the remnant surge voltage decreases when the value of the inductor 21 (L) increases, and increases when the value of the inductor 21 (L) decreases. By varying the magnitude of the inductor 21 (L), the value of the remnant surge voltage $V_r$ can be precisely controlled. Such an approach has a more definite and substantial suppression effect than conventional surge voltage suppression approaches.

After a residual current passes through the inductor 21, energy $E_{(L)}$ momentarily stored in the inductor 21 is released to the high voltage capacitor 31 and the SPD 11 connected to C3 and C2. A k proportion of the residual current flows through the SPD 11 connected to C3 and C2. The remaining (1−2k) proportion of the residual current flows through the high voltage capacitor 31. The voltage increment of the output terminal 34, $V_{(34)}$, is expressed by:

$$V_{(\Delta 34)} = (1/C) \int (1-2k) I_r dt \quad (2)$$

where C is a value of the high voltage capacitor and k is in a range of 0.1 to 0.9.

As indicated by Equation (2), the voltage increment $V_{(\Delta 34)}$ is reversely proportional to the value C of the high voltage capacitor 31. The $V_{(\Delta 34)}$ decreases when the value C of the high voltage capacitor 31 increases, and increases when the $V_{(\Delta 34)}$ decreases.

A power frequency is a frequency constituted by the inductor 21 and the high voltage capacitor 31. Thus, after the residual current passes through the output terminal 34, the transient total voltage of the output terminal 34 rises to $V_T$ $$V_T = V_{34} + V_{(\Delta 34)}$$

The transient total energy Ec momentarily stored in the high voltage capacitor connected with the output terminal 34 can be expressed as follows:

$$E_c = \frac{1}{2} CV_c^2$$
$$= E_{34} + E_{(\Delta 34)}$$
$$= \int_{t_0}^{t_1} (V_{34} \times I_{34}) dt + (1-2k) \int_{t_0}^{t_1} (V_{\Delta 34} \times I_r) dt$$

where $t_0 - t_1$ is a lasting time duration of a waveform of the residual current $I_r$.

$$(1-2k) \int_{t_0}^{t_1} (V_{\Delta 34} \times I_r) dt = \frac{1}{2} CV_{(\Delta 34)}^2 = \frac{1}{2} QV_{(\Delta 34)} = \frac{1}{2} (1-2k)(I_r \times t) V_{(\Delta 34)};$$

$$CV_{(\Delta 34)} = (1-2k)(I_r \times t)$$

A lasting time duration of the voltage increment $V_{(\Delta 34)}$ is t $$t = \frac{1}{(1-2k)I_r} CV_{(\Delta 34)} \quad (3)$$

As indicated by Equation (3), the lasting time duration t of the voltage increment $V_{(\Delta 34)}$ is proportional to the value C of the high voltage capacitor 31. The lasting time duration t of the voltage increment $V_{(\Delta 34)}$ is longer when the value C of the high voltage capacitor 31 is larger, and is shorter when the value C of the high voltage capacitor 31 is smaller.

From Equations (1), (2) and (3), the remnant surge voltage Vr of the output terminal 34 of the surge energy transfer circuit 10, the inductance of the inductor 21, the value of the high voltage capacitor, and low voltage increment of the output terminal $V_{(\Delta 34)}$ and long lasting time duration t or high voltage increment of the output terminal $V_{(\Delta 34)}$ and short lasting time duration t can be effectively and precisely planned and designed to meet different customized demands and raise surge immunity of power facilities.

With reference to FIG. 3, an actual testing diagram (L-N) for common mode coupling of the surge energy transfer circuit 10 is shown. An operating voltage AC 110V is applied to the power input terminal 12. A combination wave surge combined by 10 KV 1.2/50 μS and 5 kA 8/20 μS is coupled to the input terminal 12. The test results show that a peak value of the operating voltage at the output terminal 34 rises from 145 V to 154V, which represents an increase rate of 6.2%. After lasting for 58 mSec (3.5 cycles), the operating voltage at the output terminal 34 returns to 145V (note: the voltage attenuation ratio in FIG. 3 is 100). It is evident that the present invention has a good surge energy transfer and suppression effect.

Moreover, as there are many nonlinear loads in an actual operating environment, the resulting power waveform is distorted accordingly. The power frequency constituted by the inductor 21 and the high voltage capacitor 31 in the surge energy transfer circuit 10 of the present invention can be employed to completely improve the distortion of the power waveform during the lasting time duration of the voltage increment $V_{(\Delta 34)}$ after the residual current passes through.

Figure 4:
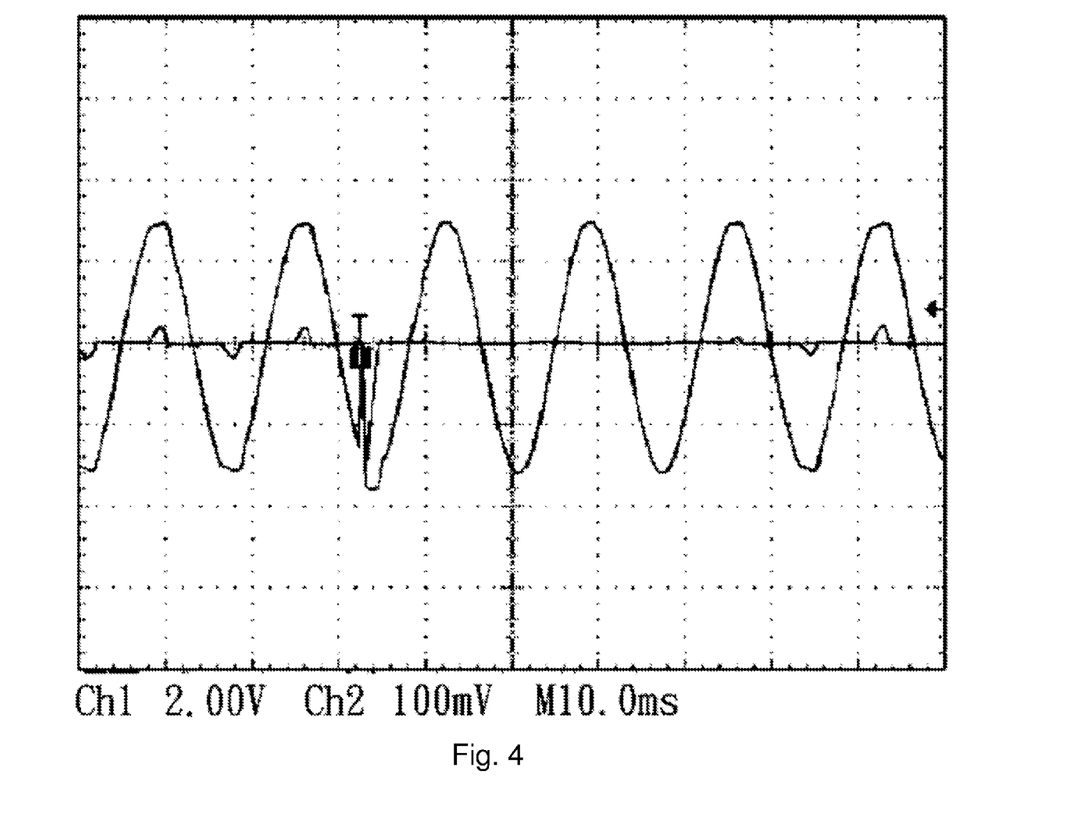
FIG. 4 is a test diagram showing common mode coupling to ground for the transfer circuit in FIG. 1.

2. With reference to FIGS. 2 and 4, when an operating voltage is applied to the input terminal, a vulnerability interference surge enters the input terminal 12 through ground to form a common mode coupling for the surge.

Transient voltage increments for 4 SPDs 41 connected between ground and C1, C2, C3, C4 and having a functionally identical characteristics are $V_{(1G)}$, $V_{(2G)}$, $V_{(3G)}$ and $V_{(4G)}$ respectively. When a surge current flows through, a transient total voltage of the output terminal 34, $V_C$ can be expressed as follows:

$$V_C = V_{34} + (V_{(\Delta1G)} - V_{(\Delta2G)}) + (V_{(\Delta3G)} - V_{(\Delta4G)}) \quad (4)$$

Since the four SPDs 41 have the same characteristics, $V_{(\Delta1g)} = V_{(\Delta2G)}$, $V_{(\Delta3G)} = V_{(\Delta4G)}$. The four SPDs 41 serve to mutually cancel the surge voltage. Therefore, the output terminal 34 is maintained in an equipotential effect to suppress the common mode coupling of the surge.

With reference to FIG. 4, an actual testing diagram (L, N-G common mode coupling) of the surge energy transfer circuit 10 is shown. When an operating AC voltage of 220V is applied to the input terminal 12, a combination wave surge, 10 kV, 1.2/50 μS, 5 kA, 8/20 μS enters the input terminal 12 and is coupled to ground; a test result shows that a peak value of the operating voltage at the output terminal 34 rises from 291V to 308V and indicates an increase rate of 5.8%. After lasting 25 mS (1.5 cycles), the operating voltage at the output terminal 34 returns to 291V (note: the voltage attenuation ratio in FIG. 4 is 100, and a current and voltage output transfer ratio is 1V/100 A). It is evident that the equipotential grounding design of the present invention has superior surge energy transfer and suppression effect.

Moreover, FIGS. 3 and 4 show a significant aspect. A surge suppression effect generated by the surge energy transfer circuit 10 can be clearly derived from the foregoing equations (1), (2), (3) and (4). A combined suppression effect for enhancing surge immunity and penetration suppression of protected power facilities can be definitely addressed to effectively improve the drawbacks of conventional approach.

Additionally, customized requirements can be easily achieved by utilizing equations (1), (2), (3) and (4). In accordance with different operating voltages (AC and DC) of power facilities, the specifications of the corresponding SPD 11, the inductor 21, and the high voltage capacitor 21 can be obtained from simple calculations to build a product in compliance with practical requirements.

Figure 5:
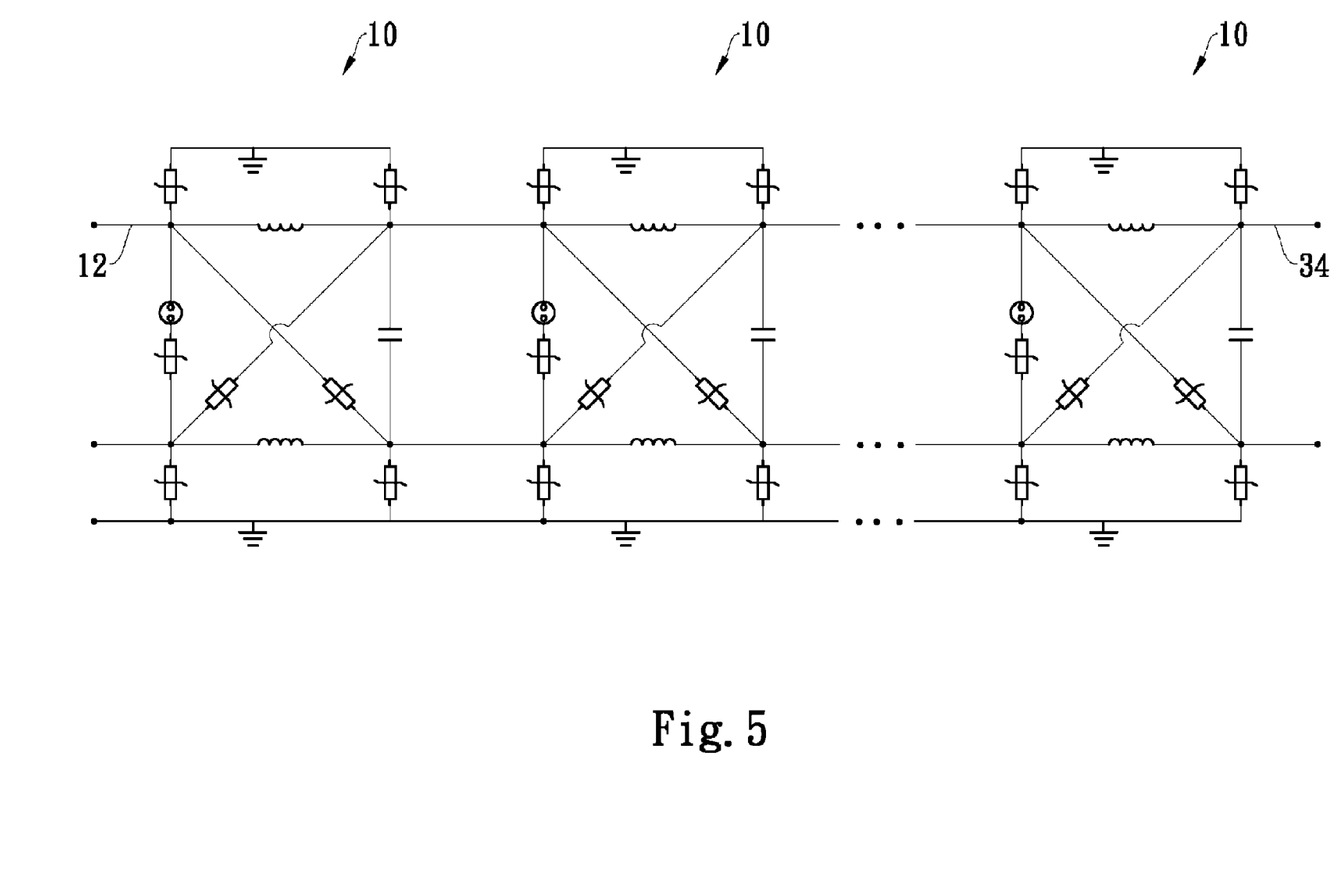
FIG. 5 is a circuit diagram of a multi-stage circuit composed of multiple surge energy transfer circuits in FIG. 2.
Figure 6:
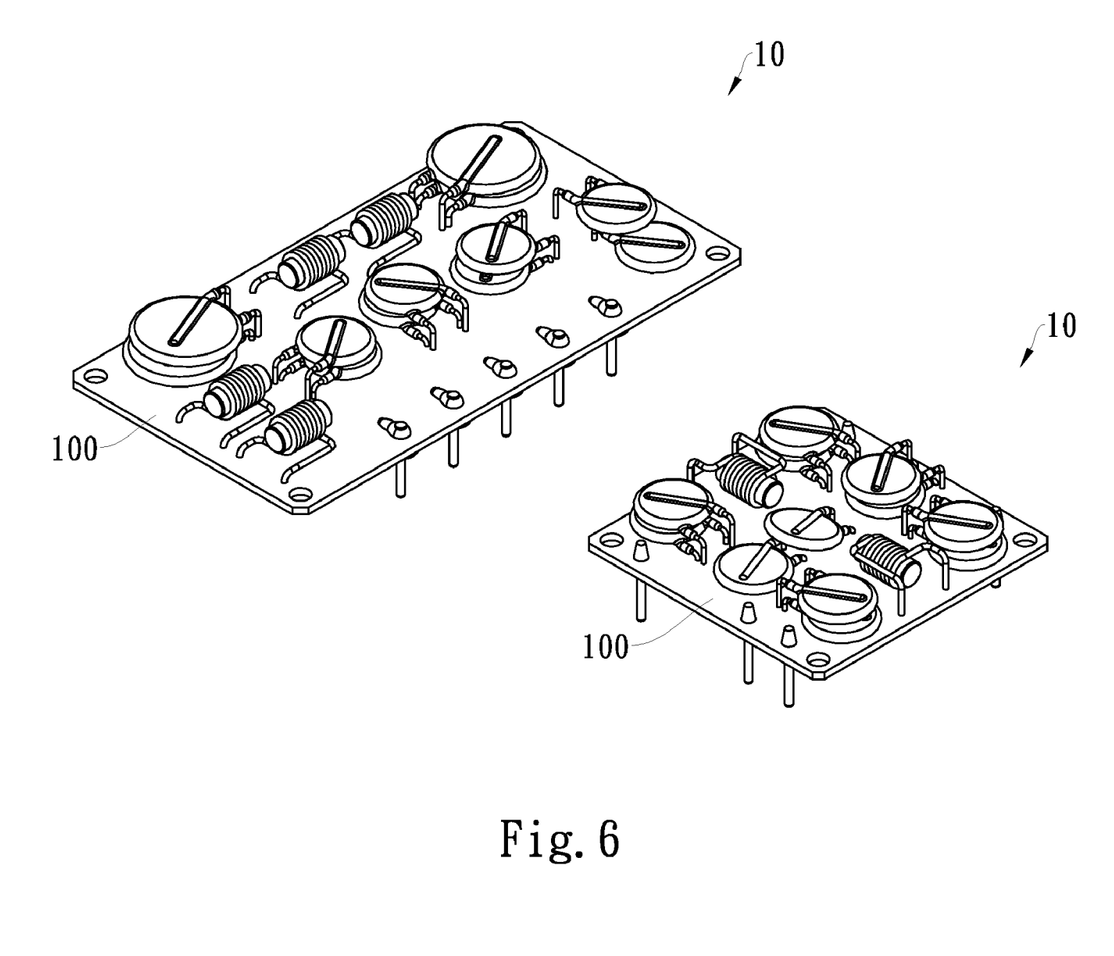
FIG. 6 is a perspective view showing different circuit modules formed by the surge energy transfer circuit in FIG. 2.
Figure 7:
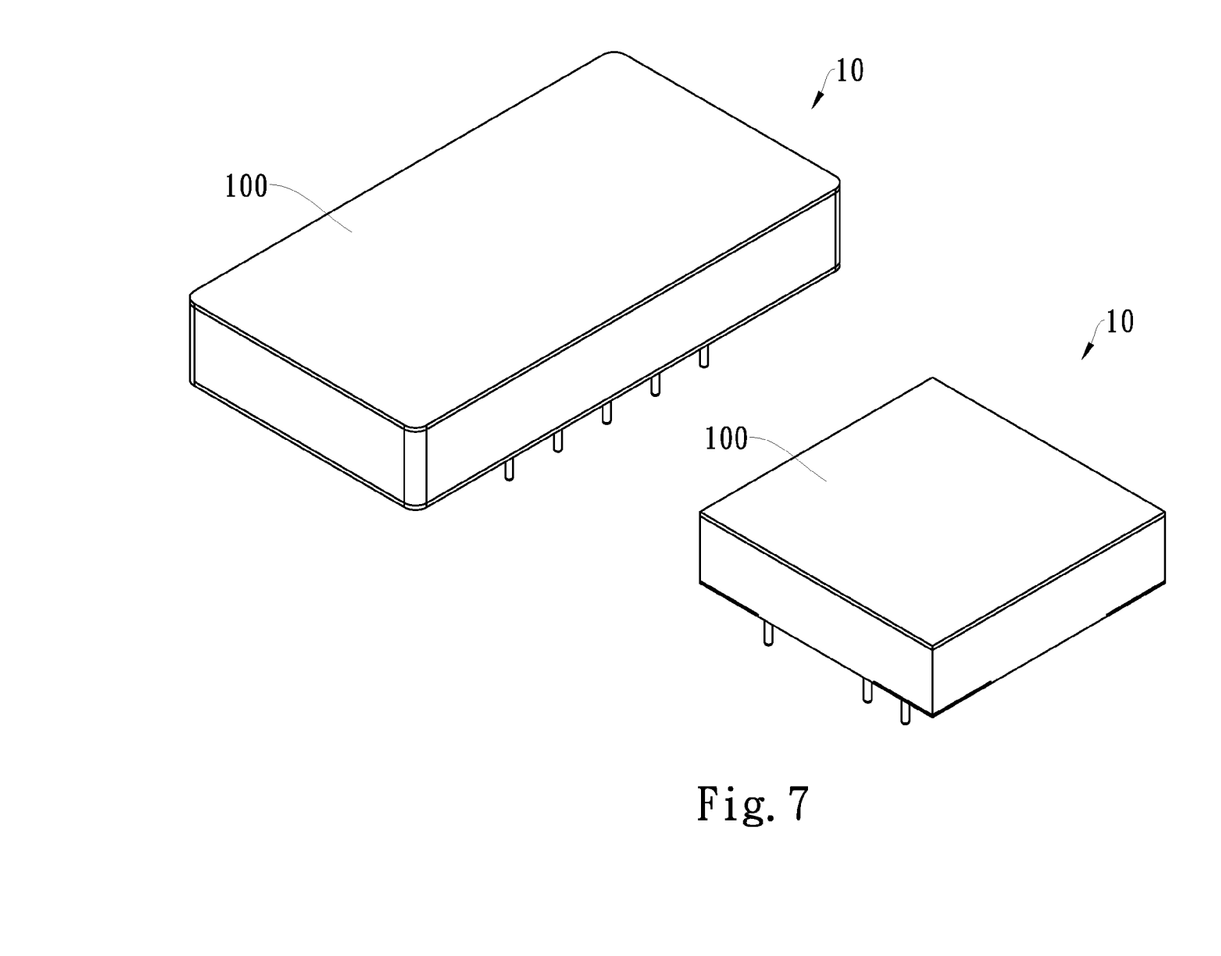
FIG. 7 is a perspective view showing the circuit modules in FIG. 6 having a respective cover.
Figure 8:
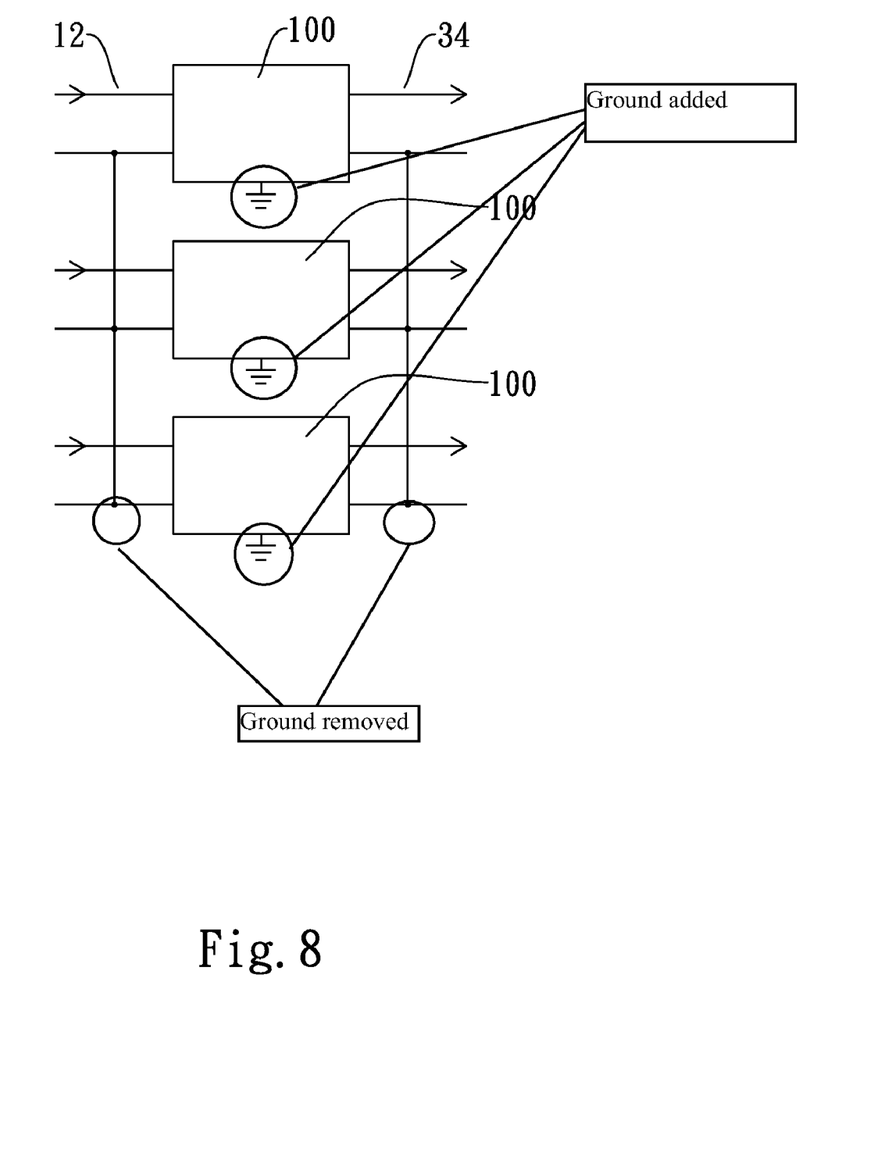
FIG. 8 is a functional block diagram of a three-phase Y-connected product built with three modules shown in FIGS. 6 and 7.
Figure 9:
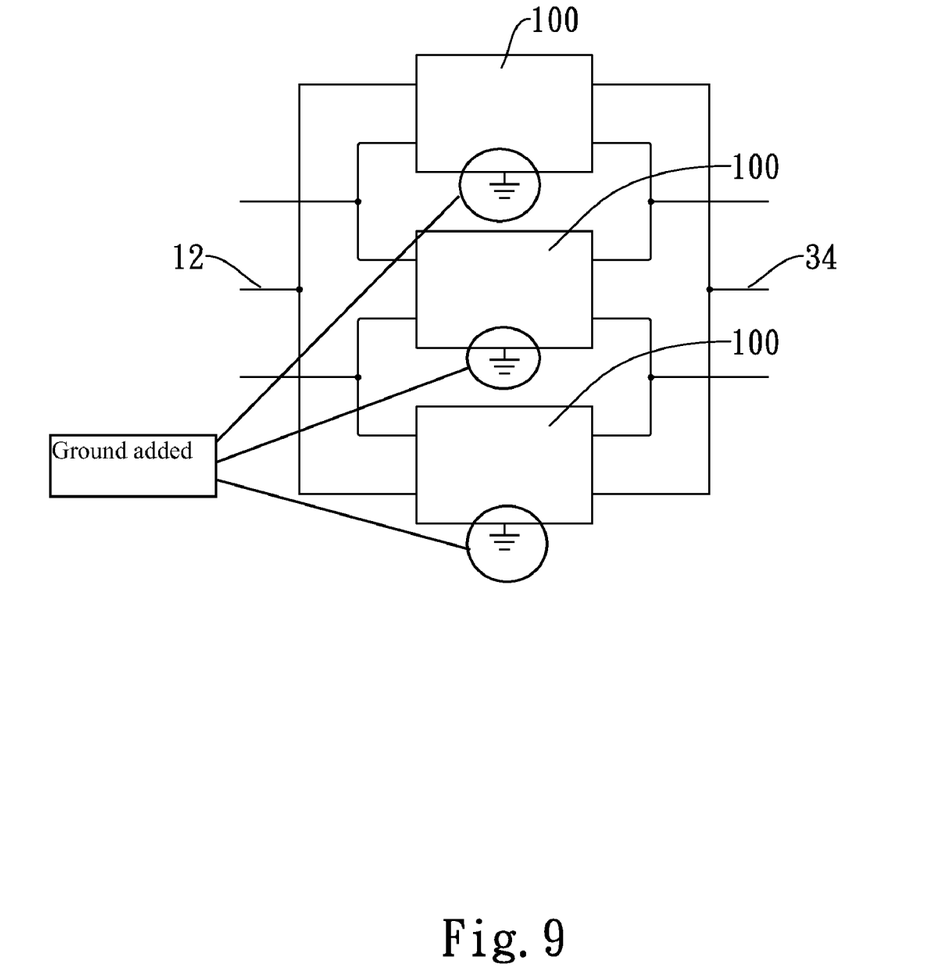
FIG. 9 is a functional block diagram of a three-phase Δ-connected product built with three modules shown in FIGS. 6 and 7.

With reference to FIG. 2, not only can the surge energy transfer circuit 10 of the present invention be used to provide a single-stage circuit but can also be used to provide a multi-stage circuit with several single-stage circuits serially connected as shown in FIG. 5 or, as shown in FIGS. 6 and 7, to practically provide various products using a module 100 based on standard requirements. Furthermore, with reference to FIGS. 8 and 9, three of the modules 100 can be integrated in accordance with consumer demand to build three-phase products that are Y-connected and Δ-connected with the input terminal 12 and the output terminal 34 to provide a diversified and extensive product range.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A surge energy transfer circuit, comprising:
an input terminal;
an output terminal;
a surge absorption unit connected to the input terminal and having at least two surge protection devices (SPD) for absorbing a percentage of an input surge energy;
a surge energy transfer unit connected to the surge absorption unit, formed by at least two inductors having a functionally identical inductances or at least two groups of inductors having a functionally identical inductances for temporarily storing a remaining percentage of the input surge energy and converting the remaining portion of the input surge energy into a voltage, wherein the percentage of the converted surge energy out of the input surge energy is equal to the percentage of a figure subtracting the inputted surge energy absorbed by the surge absorption unit from the inputted surge energy out of the inputted surge energy;
a surge energy charge and discharge unit connected with the surge energy transfer unit and the output terminal, and having at least one high voltage capacitor or at least one group of high voltage capacitors to charge and discharge the voltage converted from the remaining percentage of the input surge energy, wherein a time duration elapsed for charging or discharging is determined by a magnitude of the selected high voltage capacitor, and
an equipotential grounding unit connected to the surge absorption unit, the surge transfer unit, the surge energy charge discharge unit, the input terminal and the output terminal, and having at least two SPDs having a functionally identical characteristics so as to maintain a constant voltage of the output terminal when the input surge energy is coupled through ground, thereby reducing the input surge energy and a remnant surge voltage represented by the converted form of voltage by serially connecting a circuit formed by the foregoing units to a path through which a surge goes through;
wherein the two inductors are connected in parallel between the input terminal and the output terminal;
the high voltage capacitors are connected with one end of each one of the two inductors connected to the output terminal;
the surge energy absorption unit has two SPDs crossly connected with the two inductors, wherein two ends of each one of the two SPDs are respectively connected with one end of one of the two inductors and one end of the other of the two inductors;
the surge absorption unit is intersected with the two inductors at two nodes C1, C2 adjacent to the input terminal and two nodes C3 and C4 adjacent to the output terminal; and
the equipotential grounding unit has four SPDs having a functionally identical characteristics, wherein each one of the four SPDs is connected between each one of the four nodes C1, C2, C3, C4 and ground.

2. The surge energy transfer circuit as claimed in claim 1, wherein the input terminal and the output terminal comprise a two-port structure, the input terminal is one port used to connect with a power source, the output terminal is the other port and is used as a protection terminal of a power facility.

3. The surge energy transfer circuit as claimed in claim 1, being a single-stage circuit or a multi-stage circuit formed by a plurality of single-stage circuits.

4. The surge energy transfer circuit as claimed in claim 1, further comprising a SPD and a gas tube serially connected with the input terminal to constitute a two-stage surge suppression structure.

5. The surge energy transfer circuit as claimed in claim 1, wherein the SPDs have different clamping voltages.

6. The surge energy transfer circuit as claimed in claim 5, wherein
the inductance of each of the at least one inductors is inversely proportional to a remnant surge voltage $V_r$ of the output terminal when a surge current flows through the at least one inductor;
a transient voltage increment of the output terminal $V_{(\Delta 34)}$ is inversely proportional to the magnitude of the high voltage capacitor C; and
a lasting time duration t of the transient voltage increment of the output terminal $V_{(\Delta 34)}$ is proportional to the magnitude of the high voltage capacitor.

7. The surge energy transfer circuit as claimed in claim 6, wherein
the remnant surge voltage $V_r$ of the output terminal is expressed by:

$$V_r = V_{clamping} - (1-k) \times L(dI_r/dt)$$

where $V_{clamping}$ is a clamping voltage of one of the SPDs, a value of a residual current $I_r$ flowing through one of the SPDs is k, a remaining proportion of the residual current $I_r$ flowing through one of the at least two inductors is 1-k, and k is in a range of 0.1 to 0.9;
the transient voltage increment of the output terminal $V_{(\Delta 34)}$ is expressed by $V_{(\Delta 34)} = (1/C)\int (1-2k)I_r dt$; and
the lasting time duration t of the transient voltage increment of the output terminal $V_{(\Delta 34)}$ is expressed by $$t = \frac{1}{(1-2k)I_r} CV_{(\Delta 34)}.$$

8. The surge energy transfer circuit as claimed in claim 7, wherein
transient voltage increments for four SPDs connected between ground and C1, C2, C3, C4 and having a functionally identical characteristics are $V_{(\Delta 1G)}$, $V_{(\Delta 2G)}$, $V_{(\Delta 3G)}$ and $V_{(\Delta 4G)}$ respectively, and a transient total voltage of the output terminal, $V_c$, is expressed by:

$$V_C = V_{34} + (V_{(\Delta 1G)} - V_{(\Delta 2G)}) + (V_{(\Delta 3G)} - V_{(\Delta 4G)})$$

Wherein $V_{34}$ remains in an equipotential state because $V_{(\Delta 1G)} = V_{(\Delta 2G)}$, $V_{(\Delta 3G)} = V_{(\Delta 4G)}$ due to the functionally identical characteristics of the four SPDs.

9. A surge energy transfer circuit, comprising:
an input terminal;
an output terminal;
a surge absorption unit connected to the input terminal and having at least two surge protection devices (SPD) for absorbing a percentage of an input surge energy;
a surge energy transfer unit connected to the surge absorption unit, formed by at least two inductors having a functionally identical inductances or at least two groups of inductors having a functionally identical inductances for temporarily storing a remaining percentage of the input surge energy and converting the remaining portion of the input surge energy into a voltage, wherein the percentage of the converted surge energy out of the input surge energy is equal to the percentage of a figure subtracting the inputted surge energy absorbed by the surge absorption unit from the inputted surge energy out of the inputted surge energy;
a surge energy charge and discharge unit connected with the surge energy transfer unit and the output terminal, and having at least one high voltage capacitor or at least one group of high voltage capacitors to charge and discharge the voltage converted from the remaining percentage of the input surge energy, wherein a time duration elapsed for charging or discharging is determined by a magnitude of the selected high voltage capacitor, and
an equipotential grounding unit connected to the surge absorption unit, the surge transfer unit, the surge energy charge discharge unit, the input terminal and the output terminal, and having at least two SPDs having a functionally identical characteristics so as to maintain a constant voltage of the output terminal when the input surge energy is coupled through ground, thereby reducing the input surge energy and a remnant surge voltage represented by the converted form of voltage by serially connecting a circuit formed by the foregoing units to a path through which a surge goes through;
wherein a module is configured in accordance with a specification and is adapted for installation in power facilities having different power supply specifications; and
wherein three of the modules are integrated and Y-connected with the input terminal and the output terminal.

10. The surge energy transfer circuit as claimed in claim 9, wherein the input terminal and the output terminal comprise a two-port structure, the input terminal is one port used to connect with a power source, the output terminal is the other port and is used as a protection terminal of a power facility.

11. A surge energy transfer circuit, comprising:
an input terminal;
an output terminal;
a surge absorption unit connected to the input terminal and having at least two surge protection devices (SPD) for absorbing a percentage of an input surge energy;
a surge energy transfer unit connected to the surge absorption unit, formed by at least two inductors having a functionally identical inductances or at least two groups of inductors having a functionally identical inductances for temporarily storing a remaining percentage of the input surge energy and converting the remaining portion of the input surge energy into a voltage, wherein the percentage of the converted surge energy out of the input surge energy is equal to the percentage of a figure subtracting the inputted surge energy absorbed by the surge absorption unit from the inputted surge energy out of the inputted surge energy;
a surge energy charge and discharge unit connected with the surge energy transfer unit and the output terminal, and having at least one high voltage capacitor or at least one group of high voltage capacitors to charge and discharge the voltage converted from the remaining percentage of the input surge energy, wherein a time duration elapsed for charging or discharging is determined by a magnitude of the selected high voltage capacitor, and
an equipotential grounding unit connected to the surge absorption unit, the surge transfer unit, the surge energy charge discharge unit, the input terminal and the output terminal, and having at least two SPDs having a functionally identical characteristics so as to maintain a constant voltage of the output terminal when the input surge energy is coupled through ground, thereby reducing the input surge energy and a remnant surge voltage represented by the converted form of voltage by serially connecting a circuit formed by the foregoing units to a path through which a surge goes through;
wherein a module is configured in accordance with a specification and is adapted for installation in power facilities having different power supply specifications; and wherein three of the modules are integrated and Δ-connected with the input terminal and the output terminal.

12. The surge energy transfer circuit as claimed in claim 11, wherein the input terminal and the output terminal comprise a two-port structure, the input terminal is one port used to connect with a power source, the output terminal is the other port and is used as a protection terminal of a power facility.

* * * * *